(12) United States Patent
Juni

(10) Patent No.: US 8,384,889 B2
(45) Date of Patent: Feb. 26, 2013

(54) OUTER SHAPE DETERMINATION DEVICE

(75) Inventor: Noriyuki Juni, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 0 days.

(21) Appl. No.: 13/375,175

(22) PCT Filed: Jan. 24, 2011

(86) PCT No.: PCT/JP2011/051206
§ 371 (c)(1),
(2), (4) Date: Nov. 29, 2011

(87) PCT Pub. No.: WO2011/093240
PCT Pub. Date: Aug. 4, 2011

(65) Prior Publication Data
US 2012/0075620 A1    Mar. 29, 2012

(30) Foreign Application Priority Data
Jan. 26, 2010 (JP) .................. 2010-014821

(51) Int. Cl.
*G01N 21/00* (2006.01)

(52) U.S. Cl. .................. 356/239.4; 356/240.1

(58) Field of Classification Search .... 356/239.4–239.7, 356/240.1, 601, 427–428; 705/401, 402, 705/406, 407, 414, 410, 404; 250/223 B; 348/127; 209/522–524; 177/25.14, 246, 177/145, 253, 262, 180, 238, 239; 33/549, 33/832, 833, 1 V, 121, 122, 483, 706, 707, 33/293, 296, 700, 227
See application file for complete search history.

(56) References Cited

U.S. PATENT DOCUMENTS
5,793,652 A    8/1998 DeBarber et al.
(Continued)

FOREIGN PATENT DOCUMENTS
JP    63-078146 A    4/1988
JP    6-119597 A     4/1994
(Continued)

OTHER PUBLICATIONS

Notification of Transmittal of Translation of the International Preliminary Report on Patentability (Form PCT/IB/338) of International Patent Application No. PCT/JP2011/051206, dated Sep. 27, 2012, with Forms PCT/IB/373 and PCT/ISA/237.

(Continued)

*Primary Examiner* — Tri T Ton
(74) *Attorney, Agent, or Firm* — Westerman, Hattori, Daniels & Adrian, LLP

(57) ABSTRACT

An outer shape determination device includes: a mounting base having a rectangular mounting surface for placing an object to be subjected to determination thereon; a longitudinal light-emitting optical waveguide, a longitudinal light-receiving optical waveguide, a transverse light-emitting optical waveguide, and a transverse light-receiving optical waveguide which are provided along the periphery of the mounting surface; a heightwise light-emitting optical waveguide and a heightwise light-receiving optical waveguide which are erected upwardly from the mounting surface; a light source connected to light-emitting cores of the longitudinal, transverse and heightwise light-emitting optical waveguides; a photoelectric conversion element connected to light-receiving cores of the longitudinal, transverse and heightwise light-receiving optical waveguides; and an outer shape calculating means for receiving a light interception signal from the photoelectric conversion element to perform a computation process, thereby calculating the outer shape of the object.

8 Claims, 13 Drawing Sheets

U.S. PATENT DOCUMENTS

| | | |
|---|---|---|
| 5,914,464 A | 6/1999 | Vogel |
| 7,321,859 B2 * | 1/2008 | Cooper et al. ............ 705/34 |
| 2003/0225712 A1 | 12/2003 | Cooper et al. |
| 2006/0020476 A1 | 1/2006 | Cooper et al. |
| 2006/0155657 A1 | 7/2006 | Schneeberger et al. |
| 2008/0172313 A1 | 7/2008 | Cooper et al. |

FOREIGN PATENT DOCUMENTS

| | | |
|---|---|---|
| JP | 7-128019 A | 5/1995 |
| JP | 8-043034 A | 2/1996 |
| JP | 9-159406 A | 6/1997 |
| JP | 10-227656 A | 8/1998 |
| JP | 2000-048232 A | 2/2000 |
| JP | 2005-538433 A | 12/2005 |
| WO | 03/102501 A1 | 12/2003 |

OTHER PUBLICATIONS

International Search Report of PCT/JP2011/051206, mailing date Mar. 15, 2011.

* cited by examiner

20

20

RELATED ART

US 8,384,889 B2

OUTER SHAPE DETERMINATION DEVICE

TECHNICAL FIELD

The present invention relates to an outer shape determination device using an optical waveguide.

BACKGROUND ART

In general, the charge for a delivery including a parcel, a letter and the like is determined by the outer shape (length, width and height) of the delivery. In post offices, convenience stores and the like which accept deliveries, a person manually measures the outer shape of a delivery with a ruler to determine the charge for the delivery.

A device for automatically determining the outer shape of a delivery has been proposed to avoid reliance on the manual labor (see, for example, JP-A-2000-48232). As schematically shown in FIG. 13, this outer shape determination device includes a mounting base 60 for placing a delivery 61 thereon, a camera 62 for photographing the delivery 61 from above, a shift mechanism 63 for moving the camera 62 upwardly and downwardly, a shift position detecting means 64 for detecting the vertical position of the shift mechanism 63, and a controller 65 for controlling the operations of the camera 62, the shift mechanism 63, and the shift position detecting means 64 described above.

An outer shape determination method using this outer shape determination device is as follows. First, the delivery 61 is placed on the mounting base 60. Then, image data about the delivery 61 is captured using the camera 62, and the dimensions of the upper surface of the delivery 61 are obtained. Next, the shift mechanism 63 is moved downwardly from above, and the position at which the shift mechanism 63 comes in contact with the upper surface of the delivery 61 is detected using the shift position detecting means 64, whereby the height of the delivery 61 is obtained. Then, the outer shape of the delivery 61 is determined in the controller 65 from the dimensions of the upper surface of the delivery 61 and the height of the delivery 61 thus obtained.

SUMMARY OF THE INVENTION

However, manual determination requires much time. Also, it takes time for the outer shape determination device as described above to perform the elevating operation of the shift mechanism 63 and the like, which produces a low degree of effectiveness of time reduction. Additionally, a driving source such as a motor and the like is required to elevate the aforementioned shift mechanism 63. This makes it difficult to achieve the reduction in size and costs of the device.

The present invention provides an outer shape determination device which requires short time for determination and which achieves the reduction in size and costs thereof.

The present invention is an outer shape determination device for determining the outer shape of an object to be subjected to determination, which comprises: a mounting base having a rectangular mounting surface for placing the object thereon; a first light emitting and receiving means for emitting and receiving parallel light beams arranged in a longitudinal direction along the mounting surface; a second light emitting and receiving means for emitting and receiving parallel light beams arranged in a transverse direction along the mounting surface; a third light emitting and receiving means for emitting and receiving parallel light beams arranged in a heightwise direction with respect to the mounting surface; a light source for transmitting light beams to a light emitting section of each of the light emitting and receiving means; a detecting means for detecting the reception or interception of light beams in a light receiving section of each of the light emitting and receiving means to output a signal while the object is placed on the mounting surface; and an outer shape calculating means for calculating the outer shape of the object, based on the signal from the detecting means.

For the determination of the outer shape of an object using the outer shape determination device, the light source is initially caused to emit light beams, so that the light emitting and receiving means provided to extend in the longitudinal, transverse and heightwise directions of the aforementioned mounting surface emit and receive parallel light beams. Such emission and reception of the parallel light beams cause the parallel light beams to be projected in three directions, i.e. in the longitudinal, transverse and heightwise directions, with respect to the mounting surface of the mounting base. When the object is placed on the mounting surface of the mounting base in this state, the placed object intercepts some of the parallel light beams disposed in the three directions. The detecting means detects the intercepted light beams to output a signal, and the outer shape calculating means performs a computation process to calculate the length, width and height of the aforementioned object. The outer shape of the object is determined in this manner.

The object placed on the mounting surface of the mounting base intercepts parallel light beams disposed in the longitudinal, transverse and heightwise directions, whereby the outer shape of the object is determined. Thus, the time required for the determination is short (for example, one second or less). Additionally, each of the light emitting and receiving means for the projection of parallel light beams is thin and need not be elevated. Therefore, the outer shape determination device is easily reduced in size and costs.

In particular, when the outer shape determination device further comprises a display for displaying the outer shape of the object, based on calculation data outputted from the outer shape calculating means, the outer shape of the object appears on the display. This allows the clear visual recognition of the outer shape of the object.

Also, when the mounting base includes a mass measuring means for measuring the mass of the object placed on the mounting surface, the mass of the object is found at the same time that the outer shape of the object is determined.

BRIEF DESCRIPTION OF DRAWINGS

FIGS. 4A and 4B schematically show a method of producing an optical waveguide in the aforementioned outer shape determination device; in which FIG. 4A is a plan view thereof, and FIG. 4B is a sectional view taken along the line B1-B1 of FIG. 4A.

FIGS. 5A and 5B schematically show the method of producing an optical waveguide subsequent to FIGS. 4A and 4B; in which FIG. 5A is a plan view thereof, and FIG. 5B is a sectional view taken along the line B2-B2 of FIG. 5A.

in which FIG. 6A is a plan view thereof, and FIG. 6B is an enlarged view of a section taken along the line B3-B3 of FIG. 6A.

FIGS. 7A and 7B schematically show the method of producing an optical waveguide subsequent to FIGS. 6A and 6B; in which FIG. 7A is a plan view thereof, and FIG. 7B is an enlarged view of a section taken along the line B4-B4 of FIG. 7A.

DETAILED DESCRIPTION OF THE INVENTION

Next, embodiments according to the present invention will now be described in detail with reference to the drawings.

Figure 1:
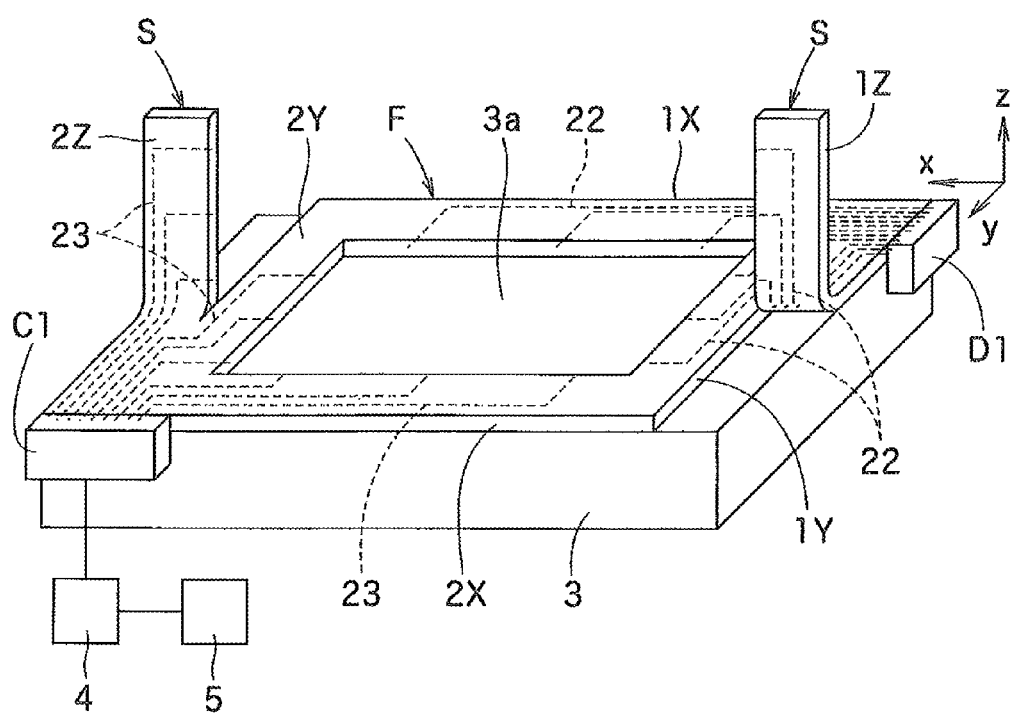
FIG. 1 is a perspective view schematically showing an outer shape determination device according to a first embodiment.

FIG. 1 is a perspective view schematically showing an outer shape determination device according to a first embodiment. This outer shape determination device includes a mounting base 3 having a mounting surface 3a of a rectangular shape (a rectangular shape in landscape orientation in this instance) for placing an object to be subjected to determination thereon. A three-dimensional optical waveguide is provided along the periphery of the mounting surface 3a, and includes a rectangular frame-shaped portion F extending along the periphery of the mounting surface 3a, and a pair of upstanding portions S configured such that parts of a pair of opposed sides of the frame-shaped portion F are bent at a right angle into an erected position. In this three-dimensional optical waveguide, the aforementioned frame-shaped portion F is configured such that two L-shaped plate members are opposed to each other and integrated together. A section (an upper right half shown) comprised of one of the L-shaped plate members and one of the aforementioned upstanding portions S erected from the one L-shaped plate member is formed as a light-emitting optical waveguide, whereas a section (a lower left half shown) comprised of the other L-shaped plate member opposed to the light-emitting optical waveguide and the other upstanding portion S erected from the other L-shaped plate member is formed as a light-receiving optical waveguide. In the frame-shaped portion F of the aforementioned optical waveguide, a light source D1 is connected to an outer edge (an upper right edge shown) on a corner of the L-shaped plate member of the light-emitting optical waveguide, and a photoelectric conversion element (detecting means) C1 is connected to an outer edge (a lower left edge shown) on a corner of the L-shaped plate member of the light-receiving optical waveguide. An outer shape calculating means 4 is electrically connected to the photoelectric conversion element C1. In this embodiment, a display 5 is further connected to the aforementioned outer shape calculating means 4. In FIG. 1, the reference numerals 22 and 23 indicated by broken lines designate cores (a passageway for light). The thickness of the broken lines indicates the thickness of the cores 22 and 23. Also, in FIG. 1, the number of cores 22 and 23 are shown as abbreviated, as compared with the actual number of cores 22 and 23.

Detailed description will be given below. One of the L-shaped plate members constituting the frame-shaped portion F of the aforementioned optical waveguide includes a transverse light-emitting optical waveguide 1Y extending along one side of the periphery of the mounting surface 3a (along a y-axis direction shown), and a longitudinal light-emitting optical waveguide 1X extending along another side adjacent to the one side of the mounting surface 3a (along an x-axis direction shown). The other L-shaped plate member includes a transverse light-receiving optical waveguide 2Y positioned in opposed relation to the aforementioned transverse light-emitting optical waveguide 1Y, and a longitudinal light-receiving optical waveguide 2X positioned in opposed relation to the aforementioned longitudinal light-emitting optical waveguide 1X. A heightwise light-emitting optical waveguide 1Z is provided outside the transverse light-emitting optical waveguide 1Y extending along the y-axis direction and formed integrally. A half portion of the length along the y-axis direction is bent at a right angle upwardly (along a z-axis direction shown) to form a corresponding one of the upstanding portions S. A heightwise light-receiving optical waveguide 2Z is provided outside the transverse light-receiving optical waveguide 2Y so as to be in opposed relation to the heightwise light-emitting optical waveguide 1Z, and is formed integrally. A half portion of the length along the y-axis direction is bent at a right angle upwardly (along the z-axis direction shown) to form a corresponding one of the upstanding portions S.

In the aforementioned optical waveguide, the multiple light-emitting cores 22 serving as a passageway for light are disposed in a parallel, equally spaced pattern extending from the outer edge (the upper right edge shown) on the corner of the aforementioned frame-shaped portion F where the longitudinal, transverse and heightwise light-emitting optical waveguides 1X, 1Y and 1Z meet each other to the inner edges (on the mounting surface 3a side) of the respective light-emitting optical waveguides 1X, 1Y and 1Z. The exit apertures of the respective light-emitting cores 22 are arranged in juxtaposition on the inner edges (on the mounting surface 3a side) of the respective light-emitting optical waveguides 1X, 1Y and 1Z. The longitudinal, transverse and heightwise light-receiving optical waveguides 2X, 2Y and 2Z are similarly configured. Specifically, the multiple light-receiving cores 23 serving as a passageway for light are disposed in a parallel, equally spaced pattern extending from the outer edge (the lower left edge shown) on the corner of the aforementioned frame-shaped portion F where the longitudinal, transverse and heightwise light-receiving optical waveguides 2X, 2Y and 2Z meet each other to the inner edges (on the mounting surface 3a side) of the respective light-receiving optical waveguides 2X, 2Y and 2Z. The entrance apertures of the respective light-receiving cores 23 are arranged in juxtaposition on the inner edges (on the mounting surface 3a side) of the respective light-receiving optical waveguides 2X, 2Y and 2Z. The exit apertures of the aforementioned light-emitting cores 22 and the entrance apertures of the light-receiving cores 23 corresponding to the exit apertures are in face-to-face relation.

Thus, parallel light beams arranged in the longitudinal direction are emitted from and received by a combination of the longitudinal light-emitting optical waveguide 1X and the longitudinal light-receiving optical waveguide 2X (a first light emitting and receiving means). Also, parallel light beams arranged in the transverse direction are emitted from and received by a combination of the transverse light-emitting optical waveguide 1Y and the transverse light-receiving optical waveguide 2Y (a second light emitting and receiving means). Also, parallel light beams arranged in the heightwise direction are emitted from and received by a combination of the heightwise light-emitting optical waveguide 1Z and the heightwise light-receiving optical waveguide 2Z (a third light emitting and receiving means).

The aforementioned light source D1 is connected to the end surfaces of the light-emitting cores 22 (the end surfaces opposite from the aforementioned exit apertures) at the outer edge (the upper right edge shown) on the corner of the aforementioned frame-shaped portion F where the longitudinal, transverse and heightwise light-emitting optical waveguides 1X, 1Y and 1Z meet each other, and is configured to transmit light beams to the light-emitting optical waveguides 1X, 1Y and 1Z. Preferably, the aforementioned light source D1 is a light source which emits light of wavelengths in an infrared region invisible to the human eye. Examples of the light source D1 include a light-emitting diode and a semiconductor laser.

The aforementioned photoelectric conversion element C1 is connected to the end surfaces of the light-receiving cores 23 (the end surfaces opposite from the aforementioned entrance apertures) at the outer edge (the lower left edge shown) on the corner of the aforementioned frame-shaped portion F where the longitudinal, transverse and heightwise light-receiving optical waveguides 2X, 2Y and 2Z meet each other. This photoelectric conversion element C1 detects the intensity of light beams entering the light-receiving cores 23 to convert the result of detection into an electric signal. Preferably, the aforementioned photoelectric conversion element C1 is a one-dimensional image sensor including light-receiving pixels (for example, photodiodes) arranged side by side in a line. Examples of the photoelectric conversion element C1 include a complementary metal-oxide semiconductor (CMOS) and a CCD (charge coupled device) image sensor.

The aforementioned outer shape calculating means 4 generally includes a memory, a central processing unit (CPU), and the like. The outer shape calculating means 4 performs a computation process to calculate dimensions including the length, width and height of an object to be subjected to determination, based on the electric signal (the intensity of light beams entering the light-receiving cores 23) from the aforementioned photoelectric conversion element C1.

Examples of the object to be subjected to determination include deliveries such as parcels and letters. The mounting surface 3a of the aforementioned mounting base 3 for placing such a delivery thereon has an area, for example, in the range of 100 to 10000 cm$^2$.

The outer shape determination of an object is made using the aforementioned outer shape determination device, for example, in a manner to be described below.

Prior to the outer shape determination of an object, the calibration of the outer shape determination device is first performed.

[Calibration]

Figure 2A:
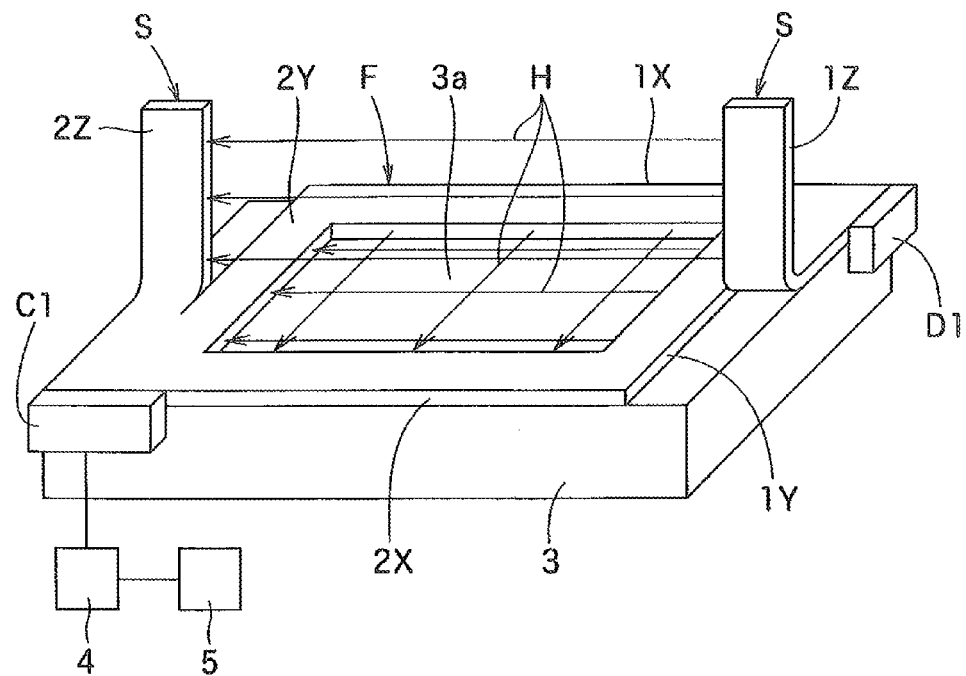
FIGS. 2A and 2B are illustrations showing a method of using the aforementioned outer shape determination device.

First, the light source D1 is caused to emit light. Due to the light emission from the light source D1, the light from the light source D1 is guided by the longitudinal, transverse and heightwise light-emitting optical waveguides 1X, 1Y and 1Z, and is emitted from the aforementioned light-emitting optical waveguides 1X, 1Y and 1Z in the form of parallel light beams H arranged in the longitudinal, transverse and heightwise directions over the aforementioned mounting surface 3a, as shown in FIG. 2A (although the cores 22 and 23 are not shown in FIG. 2A). Specifically, the emitted light beams H travel in a lattice form along the mounting surface 3a (the emitted light beams H arranged in parallel in the longitudinal and transverse directions), and also are arranged in the heightwise direction from the mounting surface 3a to travel in parallel to the mounting surface 3a (the emitted light beams H arranged in parallel in the heightwise direction). The emitted light beams H which are parallel enter the longitudinal, transverse and heightwise light-receiving optical waveguides 2X, 2Y and 2Z. It should be noted that only some of the large number of emitted light beams H are shown in FIG. 2A for ease of understanding.

Figure 2B:
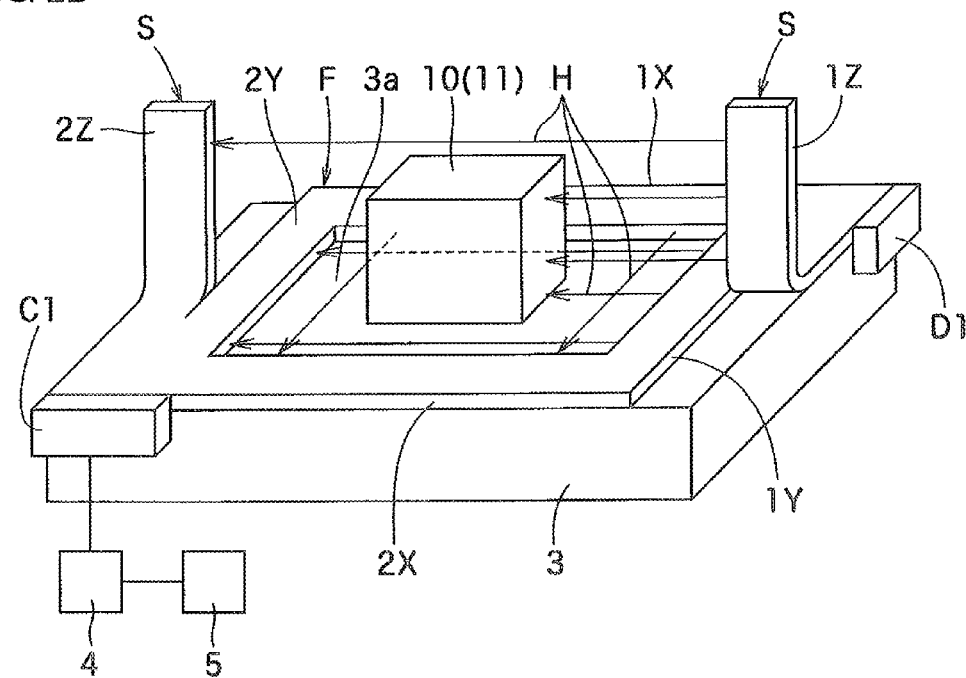
Figure 3:
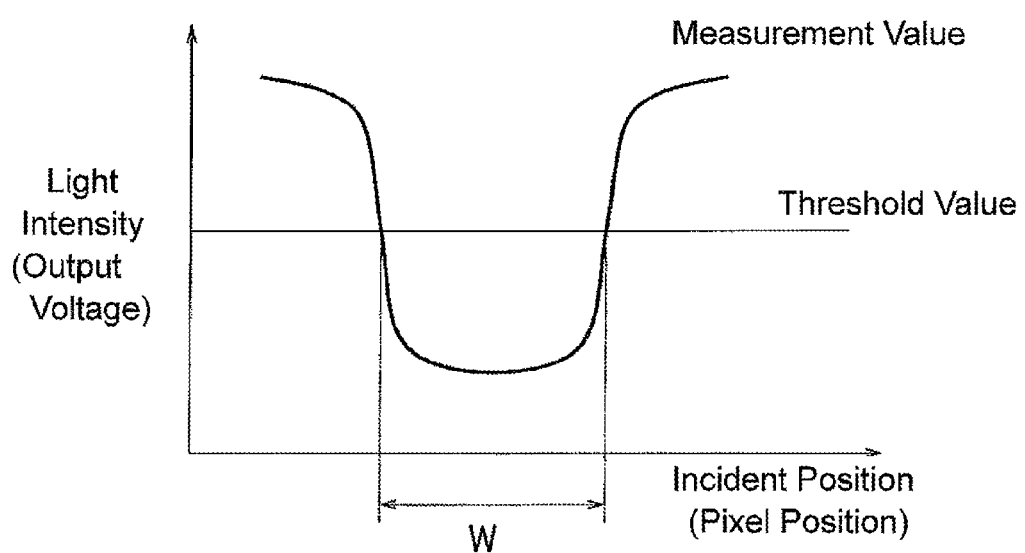
FIG. 3 is a graph showing a relationship between the incident position and light intensity of incident light.

Then, in that state, a rectangular solid 10 having known dimensions is placed on the mounting surface 3a of the mounting base 3, as shown in FIG. 2B. Due to the placement of this rectangular solid 10, the rectangular solid 10 intercepts some of the aforementioned emitted light beams H. Then, the photoelectric conversion element C1 detects the emitted light beams H intercepted by any one of the length, width and height of the rectangular solid 10 and the emitted light beams H not intercepted, whereby a relationship between the incident position (pixel position) of the incident light and the light intensity thereof (output voltage) is rendered in graph form, as shown in FIG. 3. The dimensions (W) of a portion wherein the light intensity is lower than a threshold value (a portion wherein the emitted light beams Hare intercepted) are identified from the graph. Then, the ratio (L/W) between the actual dimensions (L) of the aforementioned rectangular solid 10 and the identified dimensions (W) thereof is calculated as a conversion factor (a), and the conversion factor (a) is inputted to the outer shape calculating means 4. The aforementioned threshold value is preferably in the range of 40 to 80, assuming that the light intensity detected by the photoelectric conversion element C1 when the rectangular solid 10 does not intercept the emitted light beams H is 100. In this manner, the calibration of the aforementioned outer shape determination device (the setting of the aforementioned conversion factor (a)) is performed. After the calibration is performed, the aforementioned rectangular solid 10 is removed from the mounting surface 3a of the mounting base 3. It should be noted that the cores 22 and 23 are not shown in FIG. 2B.

After the calibration of the aforementioned outer shape determination device is performed, the outer shape determination device is used to determine the outer shape of an object 11 to be subjected to determination. An outer shape determination method thereof will be described below.

[Outer Shape Determination Method]

First, the light source D1 is caused to emit light in a manner similar to that described above, so that parallel light beams H arranged in the longitudinal, transverse and heightwise directions are emitted from the light-emitting optical waveguides 1X, 1Y and 1Z over the mounting surface 3a and so that the emitted light beams H are received by the light-receiving optical waveguides 2X, 2Y and 2Z (with reference to FIG. 2A). When the object 11 is placed on the mounting surface 3a of the mounting base 3 in that state, the placed object 11 intercepts some of the parallel light beams H traveling in three directions, i.e. in the longitudinal, transverse and heightwise directions of the aforementioned mounting surface 3a (with reference to FIG. 2B). The aforementioned photoelectric conversion element C1 is capable of detecting the position and intensity of the emitted light beams H intercepted in this manner. The photoelectric conversion element C1 sends the result of detection in the form of a light interception signal to the outer shape calculating means 4. The term "light interception signal" used herein refers to a signal obtained when the light intensity detected by the photoelectric conversion element C1 is lower than the aforementioned previously set threshold value. Upon receiving the aforementioned interception signal, the outer shape calculating means 4 identifies the length W(x), width W(y) and height W(z) of a portion where the emitted light beams H are intercepted, based on the interception signal, and further calculates the actual length L(x), width L(y) and height L(z) of the object 11 from the following equations (1) to (3) in which the aforementioned conversion factor (a) is taken into consideration.

[Math. 1]

$$L(x)=W(x)\times a \quad (1)$$

$$L(y)=W(y)\times a \quad (2)$$

$$L(z)=W(z)\times a \quad (3)$$

Further, the outer shape calculating means 4 is capable of calculating the cross-sectional area of the object 11 taken along an x-y plane as L(x)×L(y), and the volume of the object 11 as L(x)×L(y)×L(z). Information about the outside dimensions, cross-sectional area and volume of the object 11 thus calculated is displayed on the display 5. In this manner, the outer shape of the object 11 is determined.

It is preferable that 90% of the light intensity of each of the parallel light beams H emitted from the aforementioned longitudinal, transverse and heightwise light-emitting optical waveguides 1X, 1Y and 1Z has a divergence angle of not greater than 5° The width of each light beam and the density of the emitted parallel light beams H (a distance between adjacent ones of the light beams) are set as appropriate depending on the size of the aforementioned object 11 and the like. For example, the increase in the density of the emitted parallel light beams H allows the recognition of a dimensional difference of not greater than 1 mm, and also reduces errors of measurement of the dimensions (for example, to 1% or less).

In this manner, the use of the aforementioned outer shape determination device allows the automatic and rapid determination of the outer shape of the object 11. Thus, when the aforementioned outer shape determination device is placed in a post office, a convenience store and the like, the operation of determining the outer shape of a delivery which is required for the determination of the charge for the delivery is performed very efficiently. This outer shape determination device achieves the reductions in size and costs.

Next, an exemplary method of manufacturing an optical waveguide in the aforementioned outer shape determination device will be described.

Figure 4A:
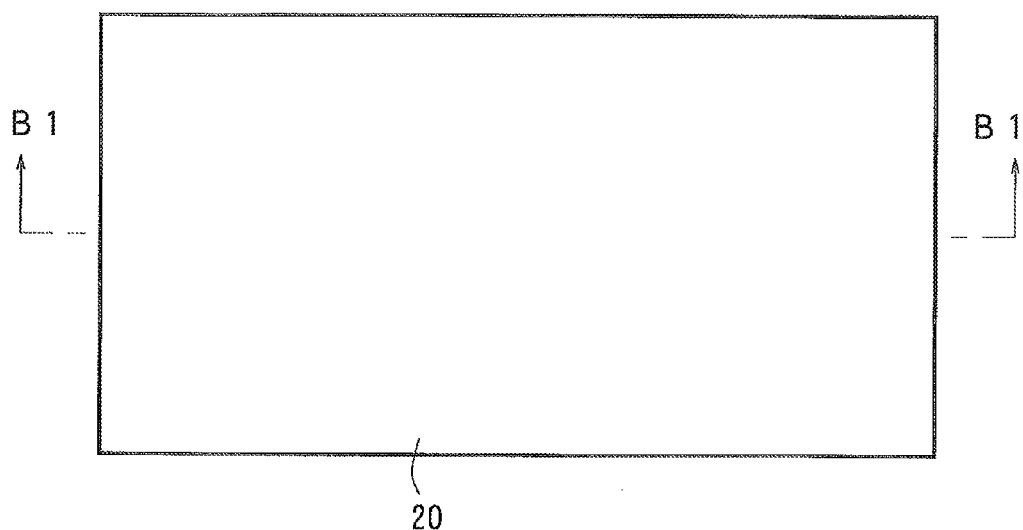
Figure 4B:
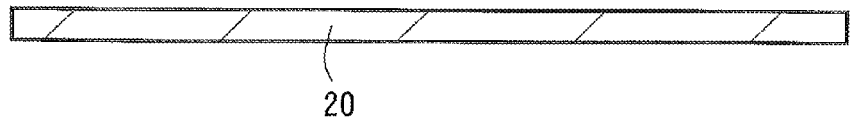

First, as shown in FIGS. 4A and 4B, a base 20 of a flat shape for use in the formation of an under cladding layer 21 (with reference to FIGS. 5A and 5B) is prepared. Examples of a material for the formation of the base 20 include metal, resin, and glass. The base 20 has a thickness, for example, in the range of 20 μm to 5 mm.

Figure 5A:
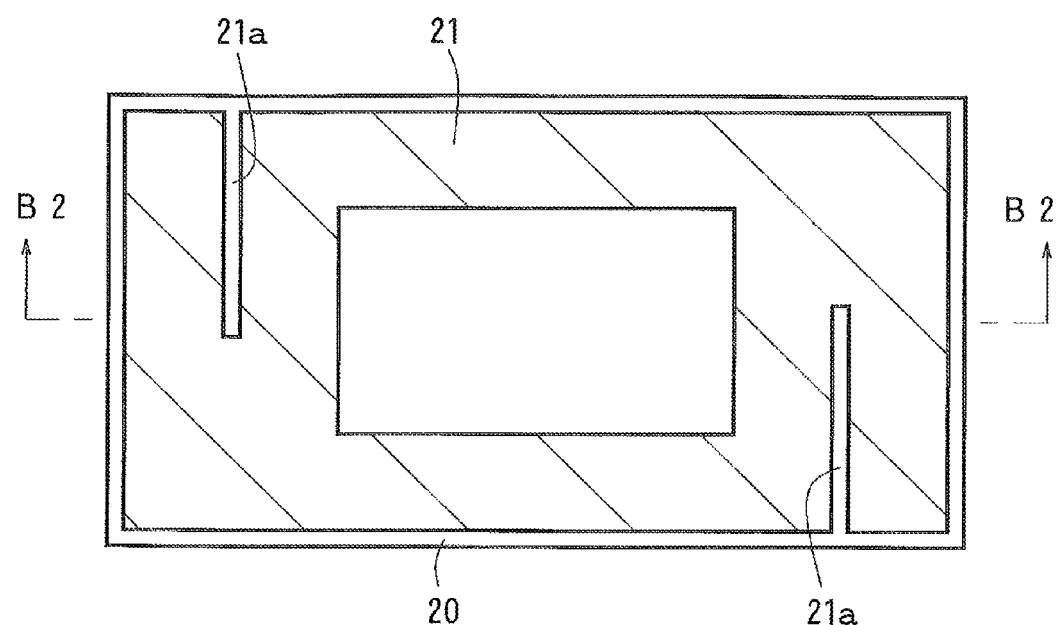
Figure 5B:
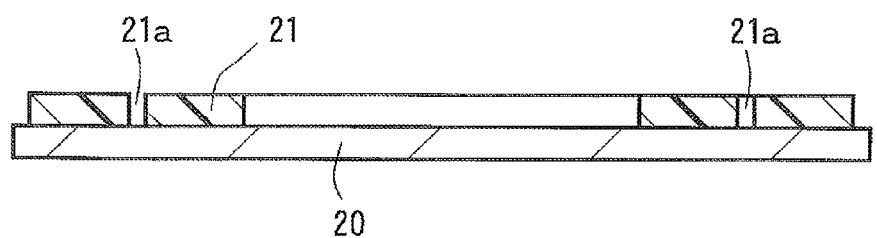

Then, a varnish prepared by dissolving a photosensitive resin such as a photosensitive epoxy resin and the like for the formation of the under cladding layer in a solvent is applied to a surface of the aforementioned base 20. Thereafter, a heating treatment is performed, as required, to dry the varnish, thereby forming a photosensitive resin layer (not shown) for the formation of the under cladding layer. The aforementioned photosensitive resin layer is then exposed to irradiation light through a photomask having an opening pattern corresponding to the pattern of the under cladding layer 21 (with reference to FIGS. 5A and 5B). Next, a heating treatment is performed, as required. Thereafter, development is performed using a developing solution to dissolve away unexposed portions of the aforementioned photosensitive resin layer, as shown in FIGS. 5A and 5B, thereby forming the remaining photosensitive resin layer into the pattern of the under cladding layer 21. This pattern of the under cladding layer 21 is a rectangular frame-shaped pattern as shaded in FIG. 5A. Opposed parts of the frame-shaped under cladding layer 21 each extending along the y-axis direction have respective slits 21a extending along the y-axis direction to a substantially middle position. The left-hand slit 21a as seen in the figure extends from the upper edge shown in the figure to the substantially middle position, and the right-hand slit 21a as seen in the figure extends from the lower edge shown in the figure to the substantially middle position. The under cladding layer 21 has a thickness generally in the range of 5 to 100 μm.

Figure 6A:
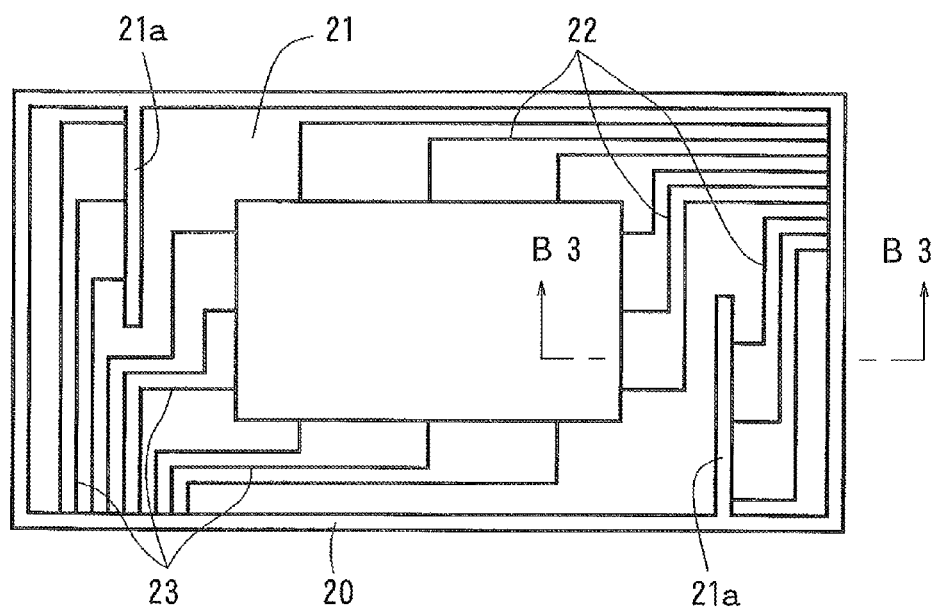
FIGS. 6A and 6B schematically show the method of producing an optical waveguide subsequent to FIGS. 5A and 5B.
Figure 6B:
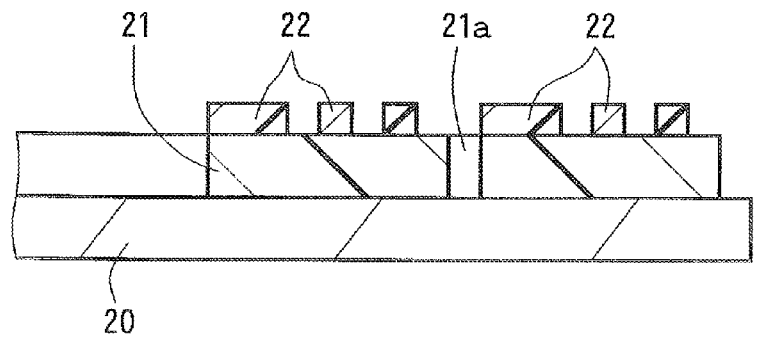

Next, a photosensitive resin layer for the formation of cores is formed on a surface of the aforementioned under cladding layer 21 in a manner similar to that in the method of forming the photosensitive resin layer for the formation of the aforementioned under cladding layer. The aforementioned photosensitive resin layer is then exposed to irradiation light through a photomask having an opening pattern corresponding to the pattern of the cores 22 and 23 (with reference to FIGS. 6A and 6B). Next, a heating treatment is performed, as required. Thereafter, development is performed using a developing solution to dissolve away unexposed portions of the aforementioned photosensitive resin layer, as shown in FIGS. 6A and 6B, thereby forming the remaining photosensitive resin layer into the pattern of the cores 22 and 23. This pattern of the cores 22 and 23 is a parallel, equally spaced pattern extending from a pair of outer edges (the upper right edge and the lower left edge shown) on the opposed corners of the frame-shaped under cladding layer 21 to the inner edges of the frame-shaped under cladding layer 21 and to the outer edges of the aforementioned slits 21a. The cores 22 and 23 have a thickness (height) generally in the range of 5 to 100 μm, and a width generally in the range of 5 to 60 μm. In FIG. 6A, the cores 22 and 23 are indicated by solid lines, and the thickness of the solid lines indicates the thickness of the cores 22 and 23. Also, in FIGS. 6A and 6B, the number of cores 22 and 23 are shown as abbreviated, as compared with the actual number of cores 22 and 23.

An example of a material for the formation of the aforementioned cores 22 and 23 includes a photosensitive resin similar to that for the aforementioned under cladding layer 21. The material for the formation of the cores 22 and 23 used herein has a refractive index higher than that of the material for the formation of the under cladding layer 21 and an over cladding layer 24 (with reference to FIGS. 7A and 7B). The adjustment of the refractive index may be made, for example, by adjusting the selection of the types of the materials for the formation of the under cladding layer 21, the cores 22 and 23 and the over cladding layer 24, and the composition ratio thereof.

Figure 7A:
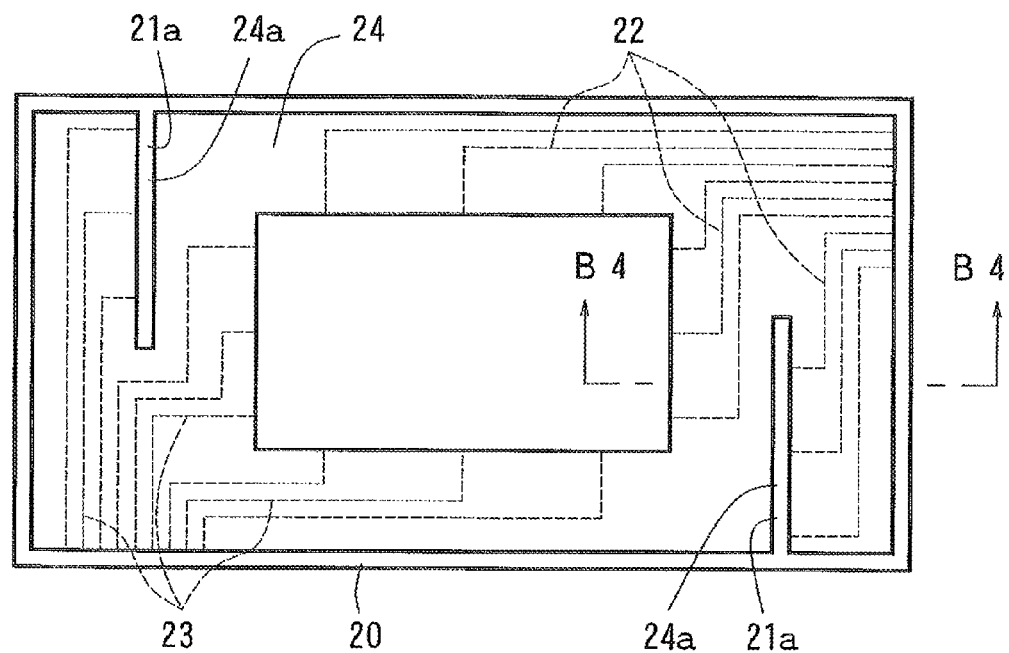
Figure 7B:
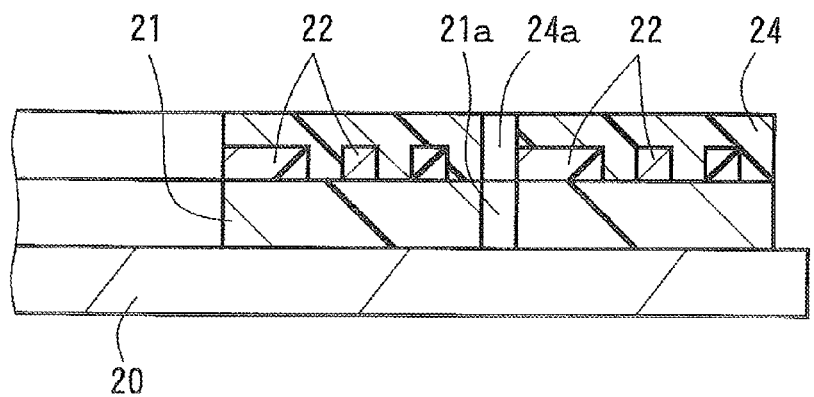

Then, a photosensitive resin layer for the formation of the over cladding layer is formed on the surface of the aforementioned under cladding layer 21 so as to cover the aforementioned cores 22 and 23 in a manner similar to that in the method of forming the photosensitive resin layer for the formation of the aforementioned under cladding layer. The aforementioned photosensitive resin layer is then exposed to irradiation light to form the over cladding layer 24, as shown in FIGS. 7A and 7B. The over cladding layer 24 as seen in plan view is identical in shape with the aforementioned under cladding layer 21 as seen in plan view, and includes slits 24a.

The over cladding layer 24 has a thickness (a thickness as measured from the surface of the under cladding layer 21) generally in the range of 50 to 2000 μm. An example of the material for the formation of the over cladding layer 24 includes a photosensitive resin similar to that for the aforementioned under cladding layer 21.

Next, the base 20 is stripped from the under cladding layer 21. This provides an optical waveguide in the form of a frame with slits and including the under cladding layer 21, the cores 22 and 23 and the over cladding layer 24. Then, parts of this optical waveguide which lie outside the aforementioned slits 21*a* and 24*a* are bent at a right angle upwardly, as shown in FIG. 1. In this manner, an intended three-dimensional optical waveguide including the frame-shaped portion F and the upstanding portions S is provided. A support plate corresponding in shape to the three-dimensional optical waveguide may be prepared, as required, and the aforementioned three-dimensional optical waveguide may be bonded to the support plate.

Thereafter, the light source D1 and the photoelectric conversion element C1 are connected to predetermined positions of the frame-shaped portion F of the aforementioned optical waveguide thus obtained. The optical waveguide with the light source D1 and the photoelectric conversion element C1 connected thereto is placed along the periphery of the mounting surface 3*a* of the mounting base 3. Further, the outer shape calculating means 4 is connected to the aforementioned photoelectric conversion element C1, and the display 5 is connected to the outer shape calculating means 4. In this manner, the outer shape determination device shown in FIG. 1 is manufactured.

Figure 8:
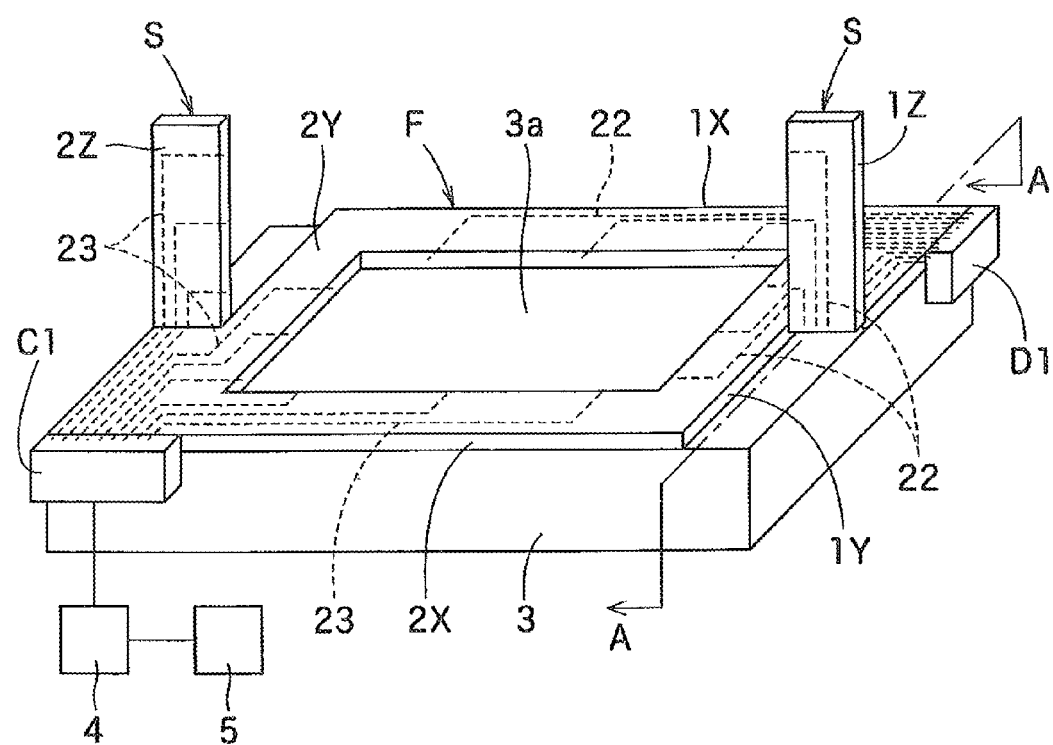
FIG. 8 is a perspective view schematically showing the outer shape determination device according to a second embodiment.

FIG. 8 is a perspective view schematically showing the outer shape determination device according to a second embodiment. The outer shape determination device according to this embodiment is such that the frame-shaped portion F and the upstanding portions S of the optical waveguide in the outer shape determination device according to the first embodiment shown in FIG. 1 are produced individually and are then connected integrally to each other. The remaining parts of the second embodiment are similar to those of the first embodiment described above. Like reference numerals and characters are used in the second embodiment to designate parts similar to those of the first embodiment.

Figure 9:
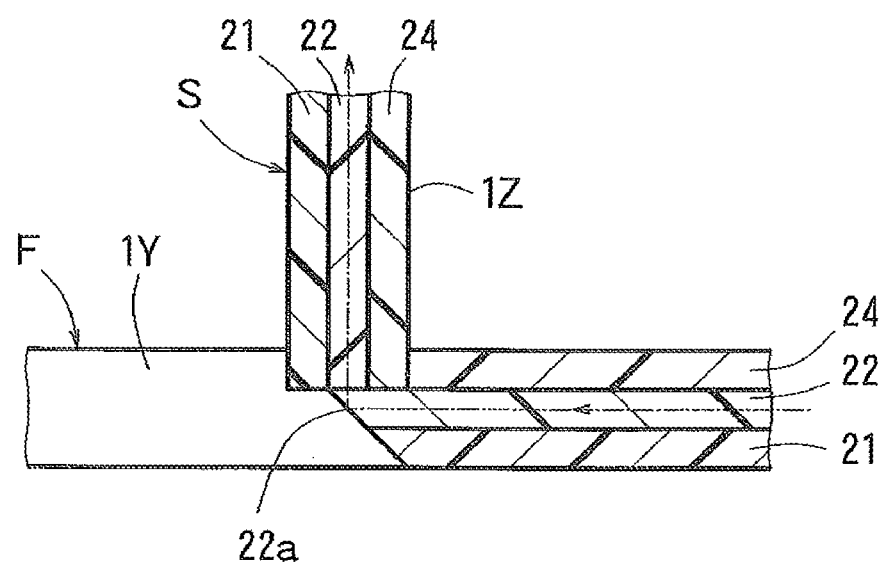
FIG. 9 is an enlarged view of a section taken along the line A-A of FIG. 8 and showing a connecting portion of a frame-shaped portion and an upstanding portion of an optical waveguide shown in FIG. 8.

The connection between the frame-shaped portion F and the upstanding portions S of the aforementioned optical waveguide is established at the heightwise light-emitting optical waveguide 1Z and the heightwise light-receiving optical waveguide 2Z. As shown in FIG. 9, the connecting portion is configured such that the frame-shaped portion F has an inclined surface formed by cutting and the like and angled at 45° with respect to the axial direction of a core 22, and such that the inside of an end surface 22*a* of the core 22 lying in the inclined surface serves as a light reflecting surface. An end surface of a core 22 of the upstanding portion S is positioned over the light reflecting surface, so that a light beam is bent through 90° and transmitted, as indicated by dash-and-dot arrows. Although the aforementioned connecting portion in the heightwise light-emitting optical waveguide 1Z is shown in FIG. 9 the aforementioned connecting portion in the heightwise light-receiving optical waveguide 2Z has a similar configuration.

The outer shape determination method using the outer shape determination device according to this second embodiment is carried out in a manner similar to that of the first embodiment described above.

Figure 10:
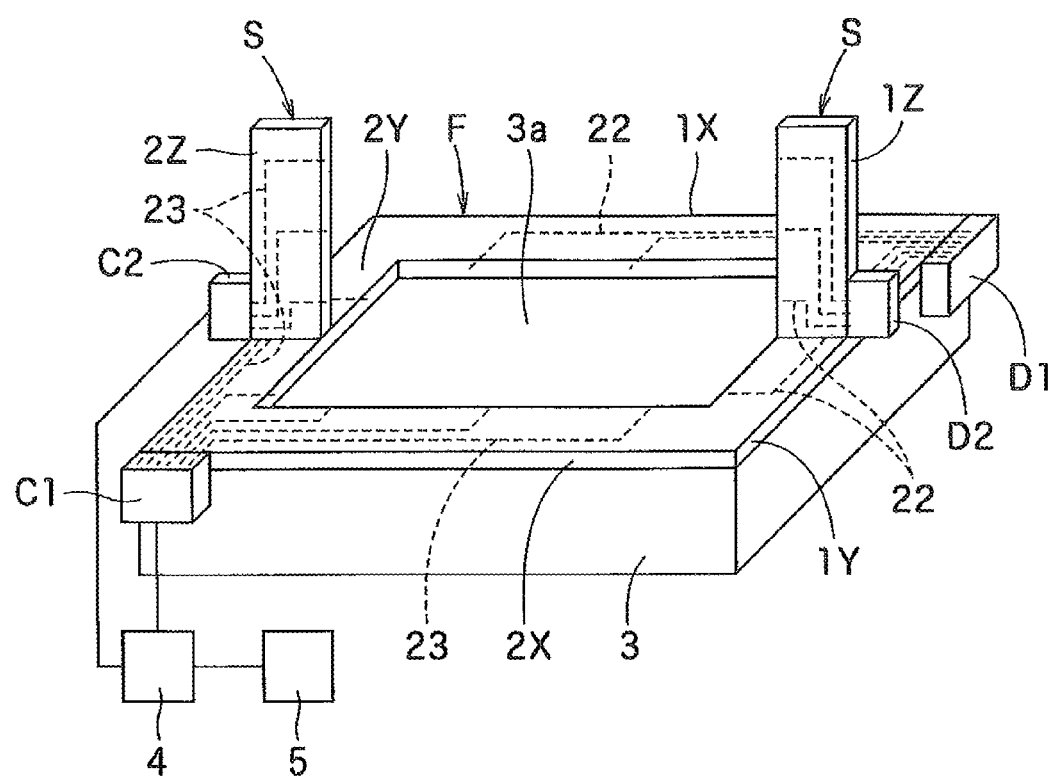
FIG. 10 is a perspective view schematically showing the outer shape determination device according to a third embodiment.

FIG. 10 is a perspective view schematically showing the outer shape determination device according to a third embodiment. The outer shape determination device according to this embodiment is such that the heightwise light-emitting optical waveguide 1Z and the heightwise light-receiving optical waveguide 2Z in the outer shape determination device according to the first embodiment shown in FIG. 1 are formed in the shape of a strip separately from the other optical waveguides 1X, 1Y, 2X and 2Y constituting the frame-shaped portion F, and are provided in an erected position over the aforementioned frame-shaped portion F. In the aforementioned heightwise light-emitting optical waveguide 1Z, the multiple light-emitting cores 22 serving as a passageway for light are disposed in a parallel, equally spaced pattern extending from the outer lower edge to the inner edge (on the mounting surface 3*a* side) thereof. A second light source (a light source different from the (first) light source D1 connected to the optical waveguides of the frame-shaped portion F) D2 is connected to the light-emitting cores 22 at the outer lower edge of the heightwise light-emitting optical waveguide 1Z. Similarly, in the heightwise light-receiving optical waveguide 2Z, the multiple light-receiving cores 23 serving as a passageway for light are disposed in a parallel, equally spaced pattern extending from the outer lower edge to the inner edge (on the mounting surface 3*a* side) thereof. A second photoelectric conversion element (a photoelectric conversion element different from the (first) photoelectric conversion element C1 connected to the optical waveguides of the frame-shaped portion F) C2 is connected to the light-receiving cores 23 at the aforementioned outer lower edge of the heightwise light-receiving optical waveguide 2Z. The second photoelectric conversion element C2 is electrically connected to the outer shape calculating means 4 which in turn is connected to the aforementioned first photoelectric conversion element C1. The remaining parts of the third embodiment are similar to those of the first embodiment described above. Like reference numerals and characters are used in the third embodiment to designate parts similar to those of the first embodiment.

In the outer shape determination method using the outer shape determination device according to the third embodiment, the first photoelectric conversion element C1 connected to the optical waveguides of the frame-shaped portion F detects the position of some light beams intercepted by an object to be subjected to determination among the emitted light beams disposed in parallel in the longitudinal and transverse directions, and the second photoelectric conversion element C2 connected to the heightwise light-receiving optical waveguide 2Z detects the position of some light beams intercepted by the object among the emitted light beams disposed in parallel in the heightwise direction. The results of detection in the first and second photoelectric conversion elements C1 and C2 are sent to the outer shape calculating means 4. Thereafter, the outside dimensions and the like of the object are displayed on the display 5 in a manner similar to that of the aforementioned first embodiment.

Figure 11:
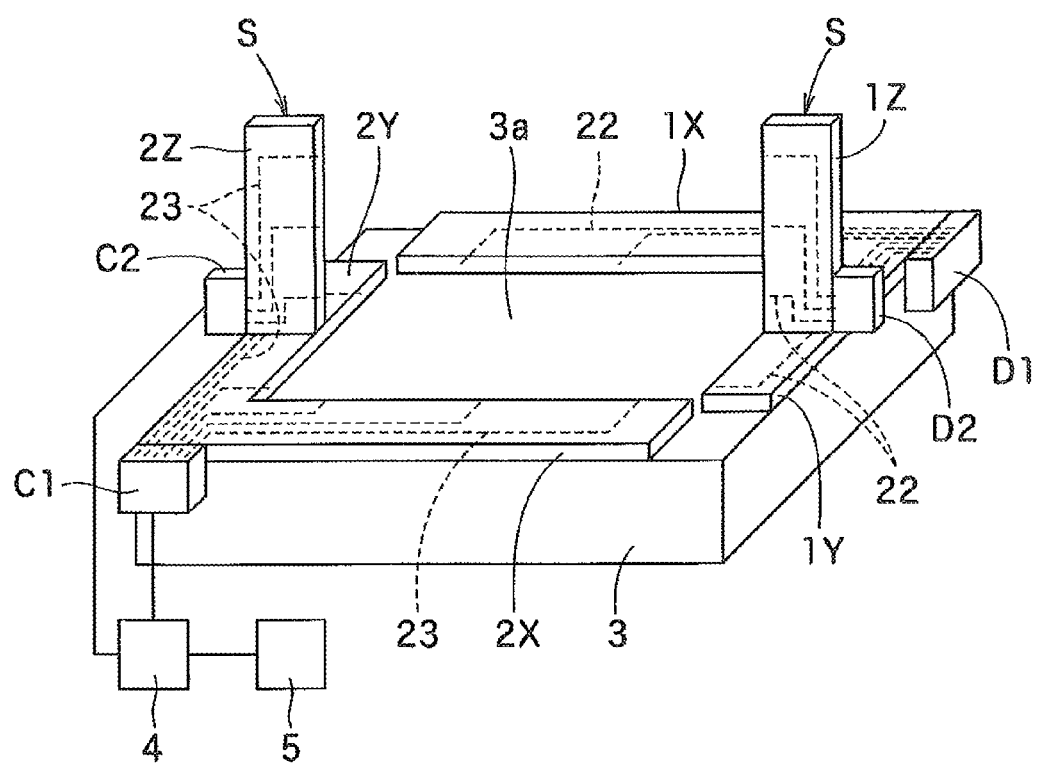
FIG. 11 is a perspective view schematically showing the outer shape determination device according to a fourth embodiment.

FIG. 11 is a perspective view schematically showing the outer shape determination device according to a fourth embodiment. The outer shape determination device according to this embodiment is such that the optical waveguides constituting the rectangular frame-shaped portion F (with reference to FIG. 10) in the outer shape determination device according to the third embodiment shown in FIG. 10 are separated into two opposed L-shaped plate members. One of the L-shaped plate members is comprised of the light-emitting optical waveguides (the longitudinal light-emitting optical waveguide 1X and the transverse light-emitting optical waveguide 1Y), and the light source D1 is connected to the light-emitting cores 22 at the outer edge on the corner thereof.

The other L-shaped plate member is comprised of the light-receiving optical waveguides (the longitudinal light-receiving optical waveguide 2X and the transverse light-receiving optical waveguide 2Y), and the photoelectric conversion element C1 is connected to the light-receiving cores 23 at the outer edge on the corner thereof. The remaining parts of the fourth embodiment are similar to those of the third embodiment described above. Like reference numerals and characters are used in the fourth embodiment to designate parts similar to those of the third embodiment.

The outer shape determination method using the outer shape determination device according to this fourth embodiment is carried out in a manner similar to that of the third embodiment described above.

Figure 12:
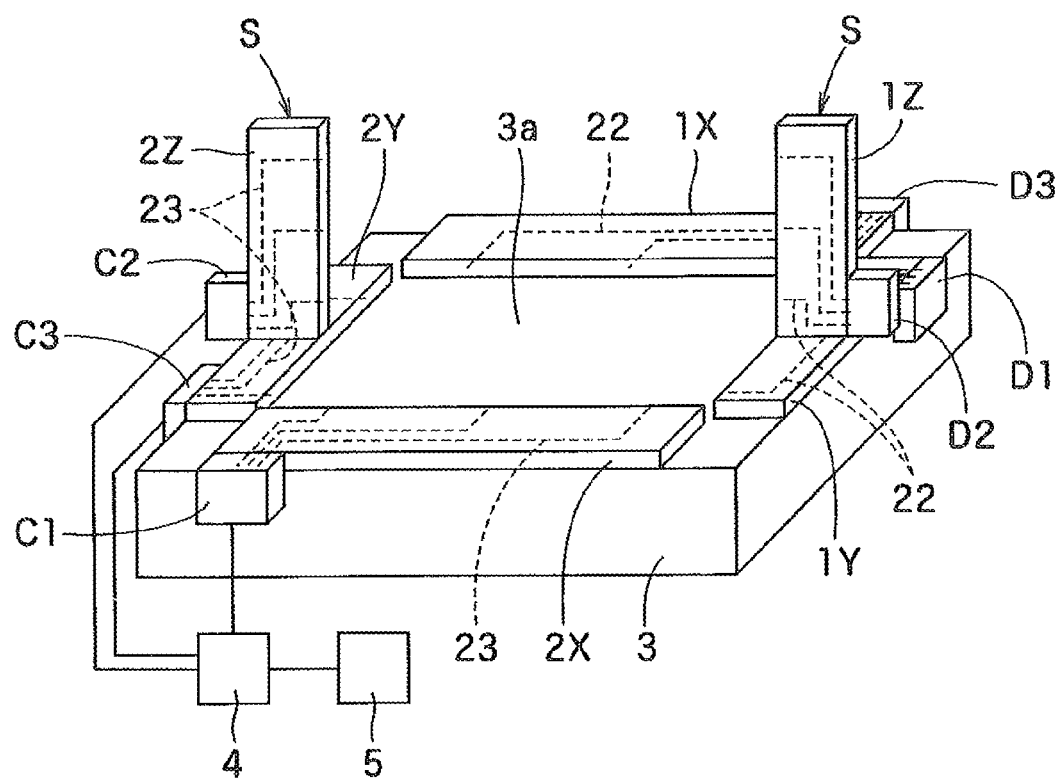
FIG. 12 is a perspective view schematically showing the outer shape determination device according to a fifth embodiment.
Figure 13:
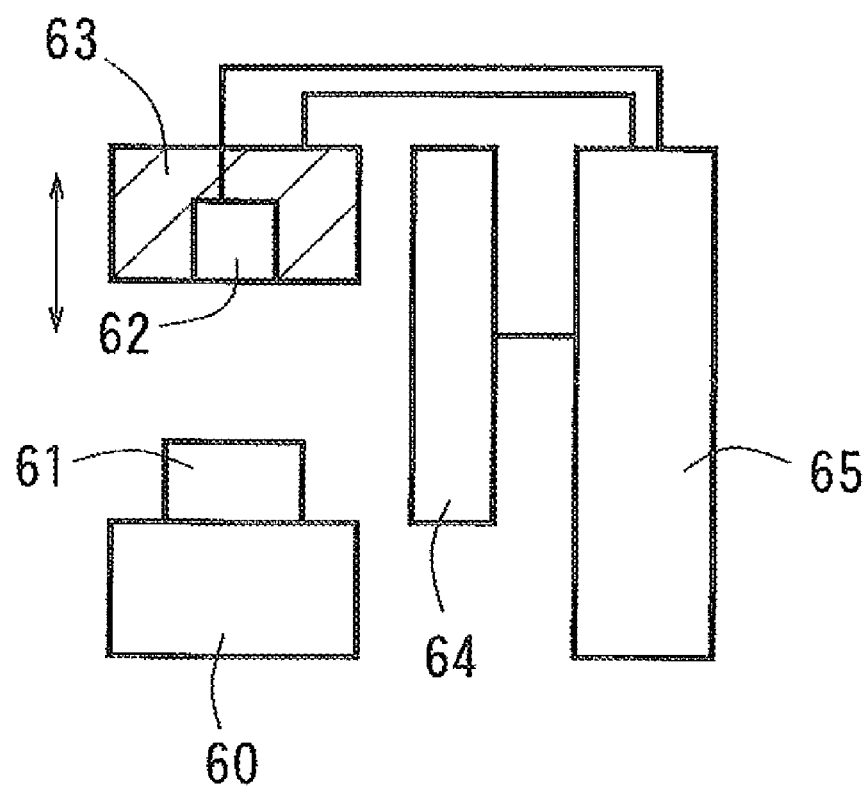
FIG. 13 is an illustration showing a conventional outer shape determination device.

FIG. 12 is a perspective view schematically showing the outer shape determination device according to a fifth embodiment of the present invention. The outer shape determination device according to this embodiment is such that the one L-shaped plate member comprised of the light-emitting optical waveguides in the outer shape determination device according to the fourth embodiment shown in FIG. 11 is separated into two sides, that is, the longitudinal light-emitting optical waveguide 1X and the transverse light-emitting optical waveguide 1Y, and such that the other L-shaped plate member comprised of the light-receiving optical waveguides is separated into two sides, that is, the longitudinal light-receiving optical waveguide 2X and the transverse light-receiving optical waveguide 2Y. In each of the aforementioned longitudinal light-emitting optical waveguide 1X and the transverse light-emitting optical waveguide 1Y, the multiple light-emitting cores 22 serving as a passageway for light are disposed in a parallel, equally spaced pattern extending from one outer edge to the inner edge (on the mounting surface 3a side) thereof. A third light source (a light source different from the first light source D1 connected to the transverse light-emitting optical waveguide 1Y in the L-shaped plate member) D3 is connected to the light-emitting cores 22 at the one outer edge of the aforementioned longitudinal light-emitting optical waveguide 1X. Similarly, in each of the longitudinal light-receiving optical waveguide 2X and the transverse light-receiving optical waveguide 2Y, the multiple light-receiving cores 23 serving as a passageway for light are disposed in a parallel, equally spaced pattern extending from one outer edge to the inner edge (on the mounting surface 3a side) thereof. A third photoelectric conversion element (a photoelectric conversion element different from the first photoelectric conversion element C1 connected to the longitudinal light-receiving optical waveguide 2X in the L-shaped plate member) C3 is connected to the light-receiving cores 23 at the one outer edge of the aforementioned transverse light-receiving optical waveguide 2Y. The third photoelectric conversion element C3 is electrically connected to the outer shape calculating means 4 which in turn is connected to the aforementioned first and second photoelectric conversion element C1 and C2. The remaining parts of the fifth embodiment are similar to those of the fourth embodiment described above. Like reference numerals and characters are used in the fifth embodiment to designate parts similar to those of the fourth embodiment.

In the outer shape determination method using the outer shape determination device according to the fifth embodiment, the first photoelectric conversion element C1 connected to the longitudinal light-receiving optical waveguide 2X detects the position of some light beams intercepted by an object to be subjected to determination among the emitted light beams disposed in parallel in the longitudinal direction, and the third photoelectric conversion element C3 connected to the transverse light-receiving optical waveguide 2Y detects the position of some light beams intercepted by the object among the emitted light beams disposed in parallel in the transverse direction, whereas the second photoelectric conversion element C2 connected to the heightwise light-receiving optical waveguide 2Z detects the position of some light beams intercepted by the object among the emitted light beams disposed in parallel in the heightwise direction. The results of detection in the first to third photoelectric conversion elements C1, C2 and C3 are sent to the outer shape calculating means 4. Thereafter, the outside dimensions and the like of the object are displayed on the display 5 in a manner similar to that of the aforementioned fourth embodiment.

Although the display 5 is connected to the outer shape calculating means 4 in the aforementioned embodiments, the aforementioned display 5 need not be provided when there is no need to display the outer shape of the object which is calculated in the outer shape calculating means 4. Alternatively, a device other than the display 5 may be connected to the outer shape calculating means 4 so that information about the outer shape of the object 11 which is calculated in the outer shape calculating means 4 is sent to the aforementioned device and is used after being processed depending on the purpose.

In the aforementioned embodiments, a measuring means for measuring the mass of the object 11 placed on the mounting surface 3a may be incorporated in the mounting base 3 so that the mounting base 3 serves also as a mass meter. In this case, the measurement of the mass of the object to be subjected to determination is achieved at the same time as the determination of the outer shape of the object 11.

In the aforementioned embodiments, a photosensitive resin is used to form the under cladding layer 21. In place of the formation of the under cladding layer 21 using this photosensitive resin, a resin film functioning as the under cladding layer 21 may be prepared and used directly as the under cladding layer 21. Alternatively, in place of the under cladding layer 21, a metal substrate such as a metal film, a substrate having a surface with a metal thin film formed thereon, and the like may be used as a body for the formation of the cores.

In the aforementioned embodiments, the optical waveguide is obtained by stripping the optical waveguide from the base 20. However, the optical waveguide still provided on the surface of the base 20 without being stripped therefrom may be mounted on the mounting base 3 and be used.

Next, an inventive example of the present invention will be described in conjunction with a conventional example. It should be noted that the present invention is not limited to the inventive example.

Example

[Material for Formation of Under Cladding Layer and Over Cladding Layer]

A material for the formation of an under cladding layer and an over cladding layer was prepared by mixing 35 parts by weight of bisphenoxyethanolfluorene diglycidyl ether (component A), 40 parts by weight of 3',4'-epoxycyclohexyl-methyl 3,4-epoxycyclohexanecarboxylate which is an alicyclic epoxy resin (CELLOXIDE 2021P manufactured by Daicel Chemical Industries, Ltd.) (component B), 25 parts by weight of (3',4'-epoxycyclohexane)methyl-3',4'-epoxycyclohexyl carboxylate (CELLOXIDE 2081 manufactured by Daicel Chemical Industries, Ltd.) (component C), and two parts by weight of a 50% by weight propylene carbonate solution of 4,4'-bis[di(β-hydroxyethoxy)phenylsulfinio]phenylsulfide bishexafluoroantimonate (component D).

[Material for Formation of Cores]

A material for the formation of cores was prepared by dissolving 70 parts by weight of the aforementioned component A, 30 parts by weight of 1,3,3-tris{4-[2-(3-oxetanyl)]butoxyphenyl}butane, and one part by weight of the aforementioned component D in ethyl lactate.

[Production of Optical Waveguide]

The material for the formation of the aforementioned under cladding layer was applied to a surface of a base made of stainless steel (having a thickness of 50 μm) with an applicator. Thereafter, a drying process was performed at 100° C. for 15 minutes to form a photosensitive resin layer. Next, a synthetic quartz photomask having an opening pattern identical in shape with the pattern of the under cladding layer was placed over the photosensitive resin layer. Then, exposure by the use of irradiation with ultraviolet light (having a wavelength of 365 nm) at 2000 mJ/cm$^2$ was performed by a proximity exposure method from over the photomask. Thereafter, a heating treatment was performed at 80° C. for 15 minutes. Next, development was performed using an aqueous solution of γ-butyrolactone to dissolve away unexposed portions. Thereafter, a heating treatment was performed at 120° C. for 30 minutes. In this manner, the under cladding layer (having a thickness of 20 μm) in the form of a frame with slits was formed (with reference to FIGS. 5A and 5B).

Then, the material for the formation of the aforementioned cores was applied to a surface of the aforementioned under cladding layer with an applicator. Thereafter, a drying process was performed at 100° C. for 15 minutes to form a photosensitive resin layer. Next, a synthetic quartz photomask having an opening pattern identical in shape with the pattern of the cores was placed over the photosensitive resin layer. Then, exposure by the use of irradiation with ultraviolet light (having a wavelength of 365 nm) at 4000 mJ/cm$^2$ was performed by a proximity exposure method from over the photomask. Thereafter, a heating treatment was performed at 80° C. for 15 minutes. Next, development was performed using an aqueous solution of γ-butyrolactone to dissolve away unexposed portions. Thereafter, a heating treatment was performed at 120° C. for 30 minutes. In this manner, the cores (having a thickness of 50 μm and a width of 50 μm) of a rectangular cross-sectional configuration were formed in a predetermined pattern (with reference to FIGS. 6A and 6B).

Then, the material for the formation of the over cladding layer was applied to the surface of the aforementioned under cladding layer with an applicator so as to cover the cores. Thereafter, a drying process was performed at 100° C. for 15 minutes to form a photosensitive resin layer. Next, exposure by the use of irradiation with ultraviolet light at 2000 mJ/cm$^2$ was performed. Thereafter, a heating treatment was performed at 120° C. for 15 minutes. In this manner, the over cladding layer (having a thickness of 150 μm as measured from the surface of the under cladding layer) was formed (with reference to FIGS. 7A and 7B).

Next, the base was stripped from the under cladding layer. This provided an optical waveguide in the form of a frame with slits and including the under cladding layer, the cores and the over cladding layer. Then, parts of the optical waveguide lying outside the aforementioned slits were bent at a right angle upwardly. In this manner, an intended three-dimensional optical waveguide including a frame-shaped portion and upstanding portions was provided (with reference to FIG. 1). The inside opening of the frame-shaped portion had dimensions of 250×250 mm, and the upstanding portions had a height of 125 mm.

[Production of Outer Shape Determination Device]

A light source (a VCSEL) and a photoelectric conversion element (a CMOS linear sensor array) were connected to predetermined positions of the frame-shaped portion of the obtained optical waveguide. The optical waveguide with the light source and the photoelectric conversion element connected thereto was placed along the periphery of a mounting surface of a mounting base. An outer shape calculating means (a personal computer (manufactured by Dell Japan Inc.) including a DAQ unit (manufactured by National Instruments Japan Corporation)) was connected to the aforementioned photoelectric conversion element, and a display was connected to the outer shape calculating means. In this manner, an outer shape determination device was produced.

[Outer Shape Determination]

Then, a rectangular solid (an object to be subjected to determination) was placed on the mounting surface of the aforementioned outer shape determination device after the calibration. Within a second of the placement, the length, width and height of the rectangular solid appeared on the display.

Conventional Example

A person measured the length, width and height of the aforementioned rectangular solid with a ruler. As a result, the measurement required 20 seconds.

The results of the aforementioned inventive example and the conventional example show that the time required for the outer shape determination of the object is shorter in the inventive example.

In the aforementioned inventive example, when the mounting base functioned also as a mass meter, the measurement of the mass of the object was achieved at the same time as the determination of the outer shape of the object as fast as described above.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

The outer shape determination device according to the present invention is applicable to the automatic and rapid determination of the outer shape of a delivery which is required for the determination of the charge for the delivery in post offices, convenience stores and the like.

The invention claimed is:

1. An outer shape determination device for determining the outer shape of an object to be subjected to determination, comprising:
   a mounting base having a rectangular mounting surface for placing the object thereon;
   a first light emitting and receiving means for emitting and receiving parallel light beams arranged in a longitudinal direction along the mounting surface;
   a second light emitting and receiving means for emitting and receiving parallel light beams arranged in a transverse direction along the mounting surface;
   a third light emitting and receiving means for emitting and receiving parallel light beams arranged in a heightwise direction with respect to the mounting surface;

a light source for transmitting light beams to a light emitting section of each of the light emitting and receiving means;

a detecting means for detecting the reception or interception of light beams in a light receiving section of each of the light emitting and receiving means to output a signal while the object is placed on the mounting surface; and an outer shape calculating means for calculating the outer shape of the object, based on the signal from the detecting means.

2. The outer shape determination device according to claim 1, further comprising a display for displaying the outer shape of the object, based on calculation data outputted from the outer shape calculating means.

3. The outer shape determination device according to claim 1, wherein the mounting base includes a mass measuring means for measuring the mass of the object placed on the mounting surface.

4. The outer shape determination device according to claim 2, wherein the mounting base includes a mass measuring means for measuring the mass of the object placed on the mounting surface.

5. An outer shape determination device for determining the outer shape of an object to be subjected to determination, comprising:

a mounting base having a rectangular mounting surface for placing the object thereon;

a longitudinal light-emitting optical waveguide and a longitudinal light-receiving optical waveguide, which emit and receive parallel light beams arranged in a longitudinal direction along the mounting surface;

a transverse light-emitting optical waveguide and a transverse light-receiving optical waveguide, which emit and receive parallel light beams arranged in a transverse direction along the mounting surface;

a heightwise light-emitting optical waveguide and a heightwise light-receiving optical waveguide, which emit and receive parallel light beams arranged in a heightwise direction with respect to the mounting surface;

a light source which transmits light beams to a light emitting section of each of the light-emitting and light-receiving optical waveguides;

a photoelectric conversion element, which detects the reception or interception of light beams in a light receiving section of each of the light-emitting and light-receiving optical waveguides to output a signal while the object is placed on the mounting surface; and an processing unit which calculates the outer shape of the object, based on the signal from the photoelectric conversion element.

6. The outer shape determination device according to claim 5, further comprising a display for displaying the outer shape of the object, based on calculation data outputted from the processing unit.

7. The outer shape determination device according to claim 5, wherein the mounting base includes a mass meter which measures the mass of the object placed on the mounting surface.

8. The outer shape determination device according to claim 6, wherein the mounting base includes a mass meter which measures the mass of the object placed on the mounting surface.

* * * * *